Aug. 16, 1960 W. E. WHIDDEN 2,949,509

UNIVERSAL TELEPHONE MOUNTING

Filed June 23, 1959

3 Sheets-Sheet 1

INVENTOR
W. E. WHIDDEN
BY John E. Wagner
ATTORNEY

INVENTOR
BY W. E. WHIDDEN
John E. Wagner
ATTORNEY

INVENTOR
W. E. WHIDDEN
BY John E. Wagner
ATTORNEY

United States Patent Office 2,949,509
Patented Aug. 16, 1960

2,949,509

UNIVERSAL TELEPHONE MOUNTING

William E. Whidden, Chatham, N.J., assignor to Bell Telephone Laboratories, Incorporated, New York, N.Y., a corporation of New York Filed June 23, 1959, Ser. No. 822,348
12 Claims. (Cl. 179—100)

This invention relates to telephone substation apparatus and more particularly to such apparatus intended for universal vertical or horizontal mounting.

There has been a long-felt need in the telephone substation apparatus field for a universal telephone set which is designed for service without modification either mounted on a vertical wall surface or resting horizontally on a desk or table. Heretofore, arrangements have been proposed employing interchangeable switch hooks and handset mountings including locks which allow either desk or wall use. In such designs, however, in the past the compromise necessitated to allow both types of use have often produced assemblies which failed to meet the needs of either use completely and often resulted in complex mechanical arrangements and structures deficient from the aesthetic standpoint.

It is an object of this invention to provide a universal telephone set.

A more specific object of this invention is to provide a telephone set for use in either a wall or desk mounting which affords stable mounting of the handset and facile removal or replacement of the handset in either position. One further object of this invention is to provide such a set which mounts a dial within the handset itself.

Another object of this invention is to provide such a telephone set in which provision is made for both lighting the dial in use and for supplying a low-level illumination for identifying the telephone set in darkened rooms.

It is a further object of this invention to achieve the above objectives without loss of the aesthetic appeal in the overall design.

The above objects are achieved in accordance with this invention, one embodiment of which comprises a telephone handset and mounting of the type disclosed in the Design Patent 184,307 to H. Dreyfuss et al., including an oval base having an inclined shelf portion terminating in a pair of spaced upstanding wings and a step to a lower shelf at the opposite end of the oval base. A handset having a generally oval outline and a restricted portion at the receiver end includes a receiver cap contoured to rest upon the lower step of the base. The body of the handset includes centrally a dial and at the lower end a telephone transmitter.

In accordance with this invention, in the region of the step between the inclined and the lower step portion of the base is an aperture through which pass a pair of horn-shaped switch hook members. The switch hook members are arcuate in shape and secured within the base to a yoke extending into the adjacent end of the base and beneath the lower step portion. The yoke is journaled about a shaft encircled by a torsion spring. The horn-shaped elements extending out in the region of the step extend into contact with the handset when placed upon the base in the region between the receiver cap and the remainder of the body of the handset. These two portions are joined in an acute angle by a pair of planar surfaces, one being the bottom of the receiver cap and the other being the planar underside of the handset. The hook elements pivoted about the uppermost point of the base when mounted in the vertical position move into the base through the restricted opening as the handset is lowered between the wing portions. When mounted in the horizontal position the hook elements traverse the same path under the applied weight of the handset, contacting the back side of the hook elements.

In addition to the contact between the base and the handset, in the region of the switch hook elements, the handset includes a transparent ring portion surrounding the dial extending above the planar surface and into contact with the planar inclined surface of the base. This transparent ring element is an extension of a light-conducting member within the handset extending from an internal lamp to the number plate. Therefore, when the handset is in place on the base it is securely positioned between the wings or on the switch hook. It is spaced slightly from the base in the inclined plane portion by the light-conducting ring. This member, preferably of transparent plastic, emits a soft glow of light conducted up through the ring and dispersed through the opening between the base and the handset thereby offering ready location of the set in darkened rooms.

A more complete understanding of this invention may be had from the following detailed description and by reference to the drawing wherein.

Figure 1:
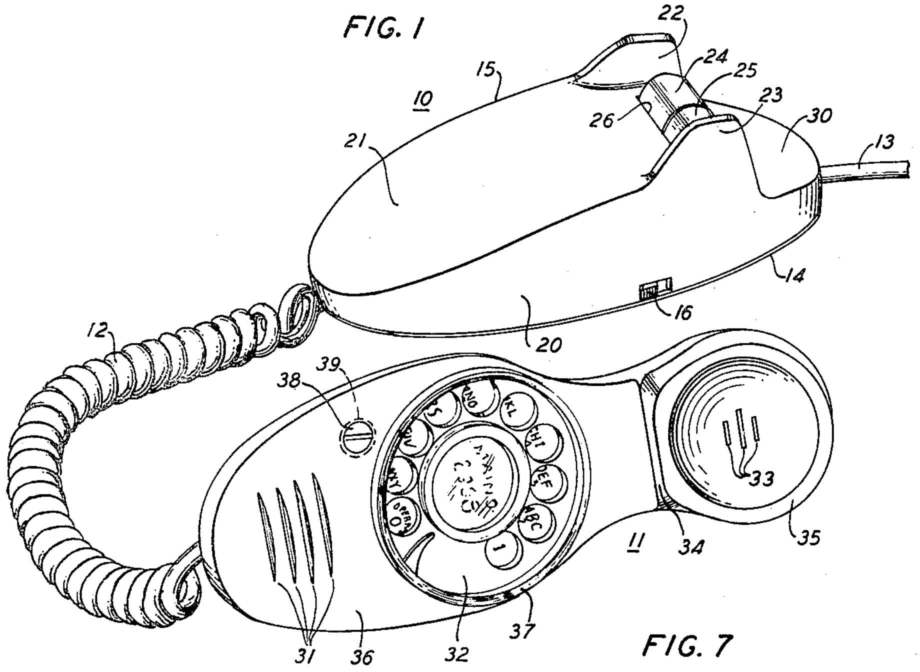
Fig. 1 is a perspective view of a complete telephone set with the handset removed.

Referring now to Fig. 1, the entire telephone set may be seen made up of a base 10 and a handset 11 connected by a handset cord 12 and arranged to be connected by a line cord 13 to a telephone line. The base includes a pan or back 14 of oval shape upon which the components within the base 10 are mounted, and an overlying housing 15 conforming to the oval shape of the back 14. A cut-out in the lower edge of the housing is present for the operating member 16 of a slide switch which may be used, for example, to adjust the level of illumination of a night light. The housing 15 includes a continuous side wall 20 which slopes slightly inward and upwardly toward an inclined surface 21 extending from one end of the telephone set for a major length thereof. The surface 21 terminates at a step which is unshown in Fig. 1, but lies between a pair of wing elements 22 and 23 which are integral continuations of the wall 20 and are utilized for lateral positioning of the handset 11. Between the wing elements 22 and 23 are a pair of arcuate or horn-shaped switch hook members 24 and 25 extending through an opening 26 in the housing. Below the switch hook elements 24 and 25 in the housing is a lower step 30 inclined in a similar manner to the surface 21 but in the order of one-quarter its length and extending to the opposite end of the housing.

The telephone handset 11 which in its on-hook position rests on surface 21 and switch hook members 24 and 25 includes in its underside slot-like openings 31 adjacent to an internally contained telephone transmitter, unshown in the drawing, a recessed dial 32 and openings 33 in the opposite end of the handset adjacent to an internal receiver, likewise unshown. The transmitter and receiver openings 31 and 33 and the dial 32 are all positioned on the undersurface of the handset with the transmitter and dail surface 36 substantially the same length and contour as the surface 21 of the base. The receiver end of the handset includes a step 34 and a receiver cap portion 35 corresponding in position and contour to the riser and the stop 30.

Encircling the dial finger wheel is a ring 37 of transparent plastic material such as molded acrylic resin known under the trademark of "Lucite" of the E. I. du Pont de Nemours Co. Inc. The ring 37 is arranged to conduct light from an internal lamp 38, the base of which is shown in the drawing. The socket for lamp 38 appears as a dotted line 39. The ring 37, by internal reflection from its beveled surface emits a ring of light around the dial which is visible when the handset is on the base 10. The primary function of the lamp is for dial illumination when the telephone set is in use.

It should be noted that the dial 32 of the handset 11 is recessed into the housing. Such placement of the dial gives it mechanical protection as in the case where the handset might be dropped and also minimizes the possibility of the inadvertent rotation of the finger wheel during use of the handset. Furthermore, the position of the dial on the underside of the handset provides a protection from dust and contaminants which constitutes a very real problem in telephone sets with the dial exposed.

The outer or back surface of the handset is curvilinear throughout and intended to constitute an extension of the surface 20 producing an oval overall appearance in longitudinal, transverse and horizontal planes. The details of the design of the telephone base and handset may be seen in more detail by reference to design patent to H. Dreyfuss et al., identified above.

Owing to the cooperative relationship and design of the handset 11 and base 10, it is essential that the switch hook elements which are necessary for the electrical switching of the telephone set do not disturb the design when the telephone set is mounted in either the horizontal or vertical position. The horn-shaped members 24 and 25 constituting the actual switch hook are mounted in the base 10 and retract through the housing 20 into the base 10 when the handset 11 is in place. The retraction of the horn-shaped members 24 and 25 into the housing 15 is along an arcuate path determined by its switch hook mechanism, hereinafter described. The switch hook mechanism has a comparatively long operating radius so that with respect to both the planes parallel and perpendicular to the mounting surface, the movement of the switch hooks is slight and as a result thereof the longitudinal movement of the handset 11, when it is placed on the base 10, likewise is slight. The lack of longitudinal movement of the handset is particularly apparent when the telephone set is mounted on a wall and compared with wall-type telephone sets of the past wherein the switch hook itself moves vertically one inch. From the first point of contact, the handset may move vertically as much as two inches. With the minimum longitudinal movement of the handset as a requirement, it is essential that the load on the horn-shaped elements 24 and 25 by the handset 11 in either mounting position be sufficient to effect the switching operations which may include the opening and/or closing of as many as seven pairs of spring contacts. Of course, when mounted in the vertical position and the entire weight of the handset 11 plus one-half the weight of the retractile cord 12 is supported by the horn-shaped elements 24 and 25, there is sufficient force. When mounted in the horizontal position, approximately sixty percent of the weight of the handset 11 is available to depress the switch hook contacts since the handset is partially supported by the surface 21. Consequently, the mounting and design of the switch hook assembly must be such as to be readily operated by this minimum force available when mounted horizontally.

Figure 2:
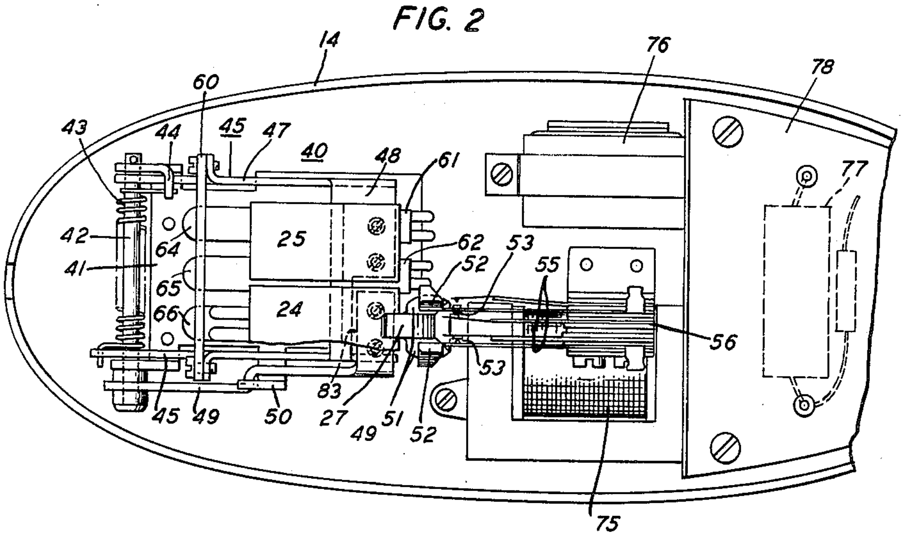
Fig. 2 is a plan view of the major part of the base of the telephone set of Fig. 1 with the housing removed.
Figure 3:
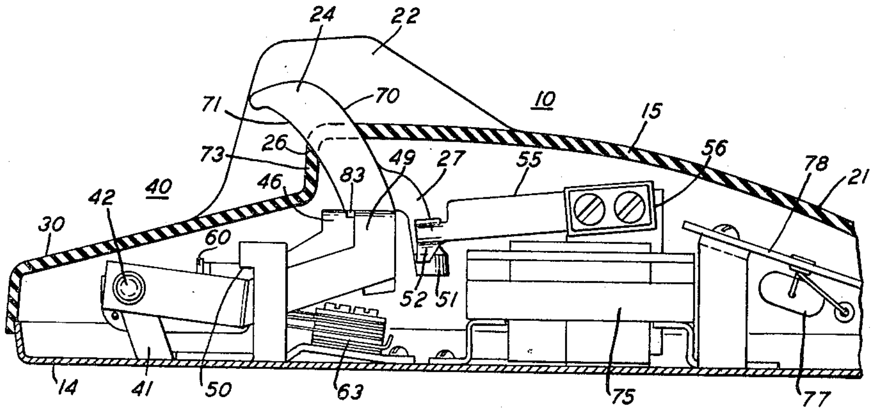
Fig. 3 is a side elevational view of the major part of the base of the set of Fig. 1.

The details of the switch hook assembly may be seen in Figs. 2 and 3. In these figures the base 14 may be seen as mounting a switch hook assembly 40 including a frame member 41 secured to the base and mounting a shaft 42 extending across the end of the base 10 underlying the step 30 of the housing, as may be seen in Fig. 3. The shaft 42 is encircled by a torsion spring 43, one end being restrained by an arm 44 integral with the frame 41 and the opposite end secured to one side of a yoke 45 pivoted about the shaft 42 and extending towards the center of the base 14. The yoke 45 includes arms 46 and 47 and an integral cross member 48. Secured to the yoke 45 is the horn-shaped element 25 which is thereby mounted for arcuate motion about the shaft 42. An auxiliary arm 49, pivoted about the shaft 42, extends along and overlies the yoke 45 and carries the horn element 24. Both of the horn-shaped elements 24 and 25 are thus individually journaled about the shaft 42 but depression of the element 24 by a contact between its support arm 49 and the yoke 45 depresses the yoke 45. The element 24, however, may be raised above the maximum level of element 25 until the arm 49 reaches a stop 50 which is integral with the frame 41. The switch hook element 24 includes an extension 27 having a pair of cam surfaces 51 which serve to spread a pair of spring contact arms 52 to allow auxiliary switching operations such as the holding of a line or exclusion of additional telephone sets in a similar manner to the operation of the extensible plunger in the patent to C. L. Krumreich No. 2,580,105, issued December 25, 1951. The springs 52 typically may carry contacts 53. In the specific embodiment appearing in Figs. 2 and 3, the cam elements 51 are designed to open or close one or more pairs of contacts and transfer contact from one path to another. The contacts are carried on respective spring elements 55 secured to an insulated assembly 56 for connection to the remainder of the telephone substation circuit including an induction coil 75 and a ringer 76.

The major or prime switching contacts of the telephone set are positioned within the yoke 45 which carries between the shaft 42 and the horn members 24 and 25, a card 60 having a pair of slots extending in a direction parallel to the axis of the shaft 42. Secured to the base 14 are a plurality of spring pileup assemblies 61, 62 and 63, the last of which may be seen in Fig. 3, including leaf springs 64, 65 and 66, respectively. Underlying these springs 64, 65 and 66 are mating contact springs so that upon lifting of the handset and the rising of the switch hook elements 24 and 25, movement of the yoke 45 carrying the card 60 releases the spring elements 64, 65 and 66, closing the line contacts to the telephone set and providing other auxiliary switching functions.

As may be seen in the drawing of Fig. 2, the switch hook elements 24 and 25 which rotate the yoke 45 are secured at a distance from the axis of shaft 42 of approximately four times greater than the distance of the card from the shaft 42. The mechanical advantage of 4 is sufficient to insure adequate force applied to the spring pileup to effect trouble-free definite switching. The switch hook assembly embodies a class 2 type lever. The relative lengths of the operating arm of the yoke 45 and the card 60 may also be clearly seen in Fig. 3.

Referring now specifically to Fig. 3, the frame 41 mounted on back 14 appears located within the housing 15 adjacent the one end of the base 10 and underlying the inclined step portion 30. The shaft 42, constituting the axis about which the horn-shaped elements 24 and 25 rotate is as close to the end of the base 10 as the curvature of the outline will allow so that the operating arm of the yoke 45 is as long as possible. The horn-shaped element 24, mounted on the auxiliary arm 49, may be seen as arcuate in shape and with both the upper surface 70 and the lower surface 71 describing an arc about the axis of the shaft 42. The opening in the housing 15 is located at the corner formed between the surface 21 and the riser portion 73 of the step in the housing 15. The edges of the opening correspond in configuration to the surfaces 70 and 71 and the opening is sufficient in size to provide static clearances between the housing 15 and the switch hook elements 24 and 25. With the arcuate motion of the switch hook elements 24 and 25 around shaft 42 the static clearance is also sufficient to provide adequate moving clearances. In addition to improving the aesthetic aspect of the design by avoiding an unduly large opening in the housing 15, the reduced size of the switch hook opening also minimizes the entrance of dust and contaminants into the base 10. The clearances between the switch hook and the opening in the housnig are comparable to those surrounding the switch hook plungers in a conventional desk type telephone set and are much smaller than those present in wall-mounted telephone sets. Furthermore, the position of the handset 11 on the base 10 provides additional protection against dirt and contaminants entering the base.

In Fig. 3, the extension 27 of the element 24 carrying the camming surfaces 51 may be seen with the adjacent spring element 52 riding against the cam surfaces 51. In the case of the adjacent spring element 52, the cam surface 51 serves to open a pair of contacts, one of which is carried by the spring element 52 and more clearly seen in Fig. 2. In some cases there may be as many as nine contact springs to open or close or transfer. The remainder of the housing 15 is filled with the transmission elements of the telephone set, including the induction coil 75 and a line impedance balancing network 77, the latter secured to a terminal plate 78.

Figure 4:
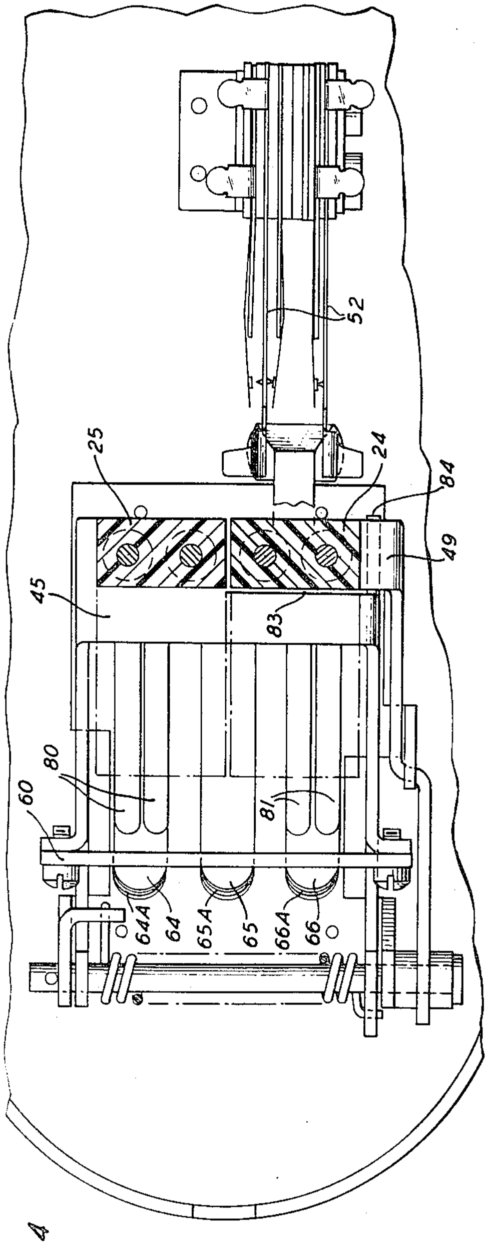
Fig. 4 is an enlarged fragmentary plan view of the switch hook and contact assembly.
Figure 5:
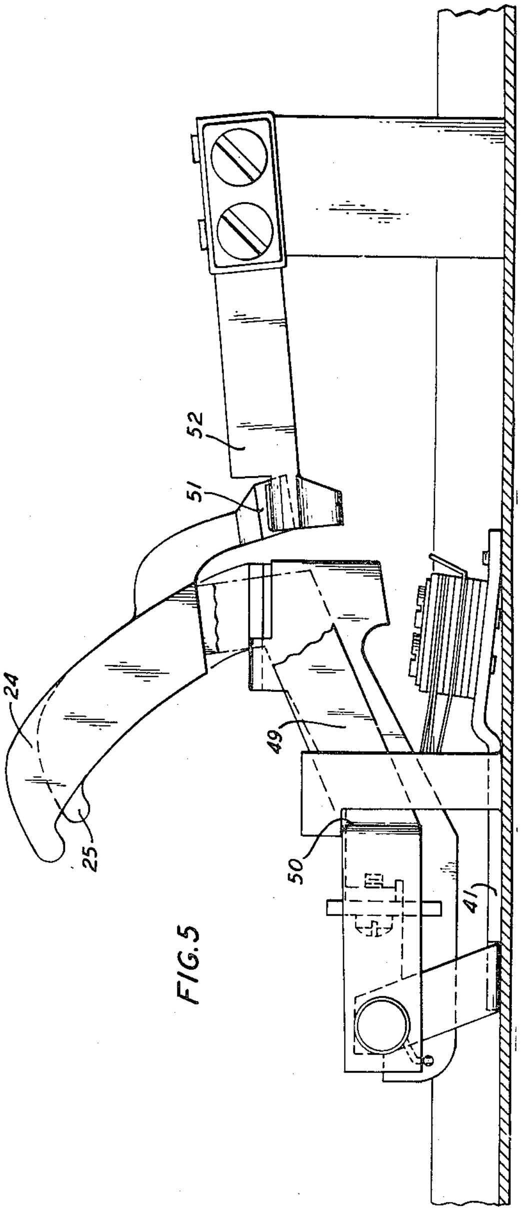
Fig. 5 is a side elevational view of the switch hook assembly of Fig. 4.

The switch hook assembly is shown in enlarged detail in Figs. 4 and 5. It may be noted that the spring elements 64, 65 and 66 passing through card 60 may include several multiple springs such as 64A, 65A and 66A. Contact-carrying arms 80 and 81 are shown overlying the respective spring elements 64 and 66 to afford the opening of two circuits upon depression of the switch hook. The number of springs 64, 65 and 66, depends upon the number of switching operations necessary for the auxiliary services provided by the telephone set such as intercommunication use including local signaling, and dial lighting.

In Fig. 4, it may be noted that the yoke 45 includes a cut-out 83 into which the arm 49 fits while overlapping the portion 84 of the yoke. With this arrangement of overlapping arm 49 and yoke 45, depression of the switch hook element 24 depresses the yoke 45 and operates the contact springs 64, 65 and 66 positioned within the yoke 45. Similarly, depression of the switch hook element 25 rotates the yoke 45 and operates the same spring contacts. The switch hook element 24, however, is rotatable independently on the arm 49 above the level of the element 25 to operate the auxiliary contacts by spreading the spring leaves 52 in the manner described above.

In Fig. 5, the switch hook element 24 appears in its raised position with the cam surface 51 spreading the contact springs 52. The arm 49 is liftable individually by pressure on the underside of the hook 24 until the arm 49 strikes the stop 50 integral with the frame 41. The mechanical arrangement of the yoke and overlying arm 49 with the individually operable switch hooks 24 and 25 has similarity to the arrangement used in exclusion switch hooks heretofore as may be seen from the patent to C. L. Krumreich cited above.

The design of the switch hook assembly 40 in cooperation with the overall design of the telephone set is such that the force available to operate the switch hooks 24 and 25 is sufficient when the set is mounted either vertically on a wall or horizontally, as on a desk. The two modes of mounting appear in Figs. 6 and 7 with the relatively long mounting radius and the arcuate form of the switch hook elements clearly visible.

Figure 6:
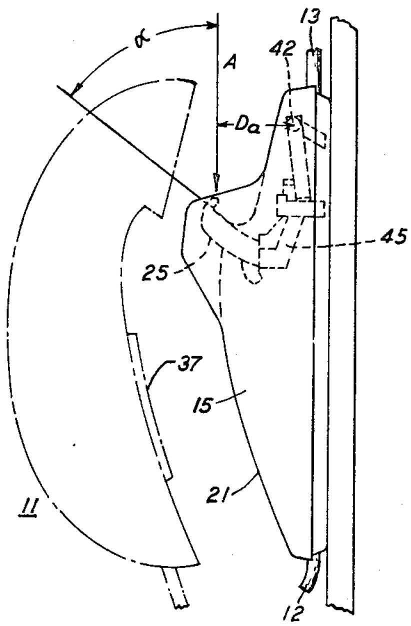
Fig. 6 is a side elevational view of the base of the telephone set mounted on a vertical support with certain details, including the switch hook assembly shown in dashed lines.

In Fig. 6, with the positioning of the handset on the switch hook the entire weight of the handset including one-half of the weight of the retractile cord totaling typically in the order of 380 grams, is indicated as the force A in a vertical direction applied to the point of the horn-shaped elements 24 and 25 producing an arcuate retraction of the members 24 and 25 into the housing.

Figure 7:
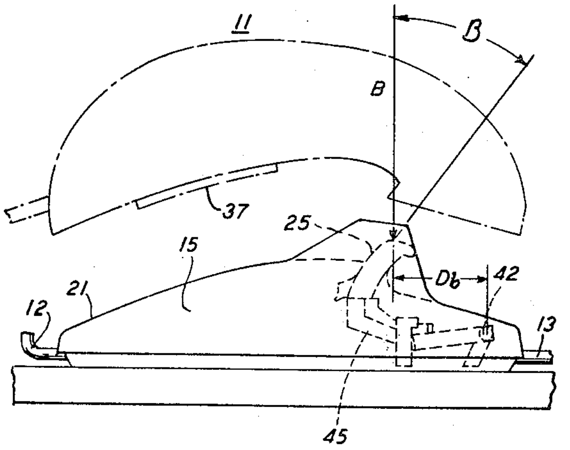
Fig. 7 is a side elevational view of the base of the telephone set similar to Fig. 6 but positioned on a horizontal surface such as a desk and with the handset shown in dotted lines above the base.

When the base is mounted in the position of Fig. 7 and the same handset is placed on the base, a portion of the weight of the handset is supported by the surface 21 and the remaining portion of the weight is applied to the elements 24 and 25. This weight is represented by the arrow B and with the same handset is less than half of the total weight.

In the case of vertical mounting, as in Fig. 6, the switch hooks 24 and 25 retract into the housing 15 at an angle of $\alpha$ with respect to the direction of force A. When mounted horizontally, as in Fig. 7, the retraction of switch hooks 24 and 25 is in the direction indicated by the angle $\beta$ with respect to force B. The angle $\alpha$ is greater than 45 degrees and the angle $\beta$ is its complementary angle. The moment arm of the force A constituting the entire weight of the handset and half the weight of the cord (in one specific embodiment in the order of 380 grams) is equal to the horizontal distance between the point of application of force A and the axis of the shaft 42, the distance designated as $D_a$. In the case of horizontal mounting, as in Fig. 7, the force B constitutes approximately half of the weight of the handset. This force B acts at the distance from the axis of shaft 42, designated by the distance $D_b$.

It is noted that the operating force available for the switch hook when the set is mounted in the vertical position is substantially greater than that available when the set is positioned horizontally. Consequently, the spring constants of the torsion spring around shaft 42 and the contact-carrying spring elements 64—66 are determined on the basis of this minimum operating force. With the mounting position of the shaft 42 at the extreme end of the housing and the yoke arranged to move through a small angle on operation, the moment arm $D_b$ of the operating force B increases as the switch hooks 24 and 25 retract. On the other hand, on vertical mounting with the greater force available, the moment arm $D_a$ with retraction reduces. It may therefore be noted that in the limiting condition of horizontal mounting where the minimum force is available for operating the switch hooks, its moment arm increases as the handset is placed on hook, assuring that sufficient rotating moment is available to operate the necessary switching contacts. In both cases it is fully adequate to produce switching. Additionally, since the switch hook elements 24 and 25 rotate about the comparatively long radius, the longitudinal motion of the handset is comparatively small, e.g., one-quarter inch. The relative longitudinal motion of the handset from the point of first contact to rest position in being replaced on the base is no more than one-quarter inch over a total length of the order of eight inches. The longitudinal motion during this operation is therefore hardly noticeable at all.

Each of these above factors is significant from the standpoint of providing the universal set which operates equally well without modification mounted on a wall or on a desk and which is compatible with the design of the telephone set. The minimization of the clearances between the switch hook and the housing avoids undesirable dust accumulation gaps and improves the appearance of the telephone set.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. A telephone set comprising a base including a planar surface serving as the mounting surface when mounted vertically or the bottom surface when positioned horizontally, a housing over said base including a first surface extending over a major length of said base and terminating at a lower step portion extending over the remaining minor length of said base, a pair of handset retaining elements in spaced juxtaposition in the region between said first surface and said lower step portion, said housing including an opening between said handset retaining elements, a handset conforming in shape to said surface and said step portion including a restricted portion corresponding to said handset retaining elements of said base, a switch hook assembly in said base including a shaft secured within said housing at the end of said base adjacent to said lower step portion, rotatable means secured to said shaft and extending toward the center of said base, an arcuate shaped hook member secured to said rotatable member and extending through the opening in said housing, said hook member having a radius of curvature about said shaft whereby said hook member describes an arcuate movement extending into said housing upon positioning of said handset into said base.

2. The combination in accordance with claim 1 wherein said handset includes a major surface corresponding in shape to said first surface of said base, a receiver cap portion corresponding in shape to said lower step portion of said base, and a surface joining said major surface and said receiver cap portion forming an acute angle with said major surface for contact with the hook member of said base when positioned thereon.

3. Telephone set substation apparatus comprising a base including a housing having a major supporting surface for a handset, a lower step portion, and handset centering means in the region of the junction between said major surface and said lower step portion, a switch hook element retractable into said housing to operate switching contacts for said telephone set, a handset including a surface conforming to the shape of said major surface of said base and a surface corresponding in shape to said lower step portion, the junction between said surface of said handset conforming to said switch hook element and adapted to rest thereon, a protuberance on the major surface of said handset constituting a second resting point of said handset on said base, said protuberance including a light-conducting member including a light-emitting surface in the gap between said base and handset, and a lamp within said telephone set positioned to admit light into said light-conducting member to provide subdued illumination for said telephone set.

4. Telephone set substation apparatus comprising a base including a switch hook constituting a first supporting member for a handset, a surface constituting a second supporting surface for a handset, a handset including a surface conforming to said switch hook for support thereby and a protuberance positioned for support by said second supporting surface of said base, said protuberance comprising a light-conducting member including a light-emitting surface in the region between the said base and handset, and a lamp within said telephone set positioned to admit light into said light-conducting member to provide subdued illumination for said telephone set.

5. A universal mounting for a telephone handset comprising a base including a planar surface serving as the mounting surface when wall mounted on the bottom surface when horizontally positioned, a housing over said base including a first surface extending over a major length of said base and terminating at a lower step portion extending over the remaining minor length of said base, a pair of handset retaining elements on said housing and positioned in spaced relationship in the region of said step, said housing including an opening between said handset retaining elements, and a switch hook assembly including a rotatable member within said housing, means mounting said rotatable member at the adjacent end of said base for rotation over a minor arc, an arcuate-shaped hook member secured to said rotatable member and extending through the opening in said housing, said arcuate-shaped member having a radius of curvature about said mounting means whereby said hook member describes an arcuate movement extending into said housing upon the positioning of the handset on the base.

6. A universal mounting for a telephone handset comprising a base including a planar surface serving as the mounting surface when wall mounted on the bottom surface when horizontally positioned, a housing over said base including a first surface extending over a major length of said base and terminating at a lower step portion extending over the remaining minor length of said base, a pair of handset retaining elements on said housing and positioned in spaced relationship in the region of said step, said housing including an opening between said handset retaining elements, and a switch hook assembly including a rotatable member, within said housing, means mounting said rotatable member at the adjacent end of said base for rotation over a minor arc from a position substantially parallel to the planar surface of said base to a position above said planar surface forming an angle of less than 45°, an arcuate shaped switch hook secured to said rotatable member and extending through the opening in said housing, said arcuate-shaped member having a radius of curvature about said shaft whereby said hook member describes an arcuate movement extending into said housing upon the positioning of the handset on the base.

7. The combination in accordance with claim 6 wherein said rotatable member comprises a yoke including a pair of arms rotatably secured to said mounting means and a central connecting portion carrying said hook member.

8. The combination in accordance with claim 7 wherein a plurality of contact springs are positioned between the arms of said yoke and said arms carry means for deflecting said contact springs to open and close contacts carried thereby.

9. A telephone switch hook assembly comprising a base, a yoke including a pair of spaced arms and a connecting central portion, means mounting the arms of said yoke for rotation about an end of said base, a plurality of spring carried contacts mounted for operation upon rotation of said yoke, and an arcuate hook member having a radius of curvature about said mounting means secured to the central portion of said yoke.

10. A telephone switch hook assembly comprising a base, a yoke including a pair of spaced arms and a central connecting portion, means mounting the arms of said yoke for rotation at the end of said base, means limiting said yoke from rotation beyond an angle of less than 45° with respect to said base, a plurality of spring carried contacts mounted for operation upon the rotation of said yoke, and an arcuate hook member having a radius of curvature about said mounting means secured to the central portion of said yoke.

11. A telephone switch hook assembly comprising a base, a yoke including a pair of spaced arms and a central connecting portion, means mounting the arms of said yoke for rotation in the end of said base, means limiting said yoke from rotation beyond an angle of less than 45° with respect to said base, a plurality of spring carried contacts mounted for operation upon the rotation of said yoke, a first arcuate member having a radius of curvature about said mounting means secured to the central portion of said yoke, an arm rotatably mounted by said mounting means, a second arcuate member having a radius of curvature about said mounting means secured to said arm, means limiting said arm from rotation beyond an angle of less than 45° but greater than the maximum angle of rotation of said yoke, and contact means operable by said arm when rotated beyond the maximum angle of rotation of said yoke.

12. A switch hook comprising a first arcuate member, a second arcuate member, means mounting said first arcuate member for rotation about the axis of curvature of said first member, means mounting said second arcuate member side-by-side on the said first arcuate member for rotation about the axis of curvature of said second member, spring mounted contacts operable upon the rotation of the mounting means of both of said arcuate members and additional spring mounted contacts operable upon the rotation of the mounting means of said second arcuate member.

No references cited.